(12) United States Patent
Larson

(10) Patent No.: US 9,388,836 B2
(45) Date of Patent: Jul. 12, 2016

(54) SLIP FITTING HOLDING DEVICE AND SYSTEM

(71) Applicant: Donald B. Larson, Tampa, FL (US)

(72) Inventor: Donald B. Larson, Tampa, FL (US)

( * ) Notice: Subject to any disclaimer, the term of this patent is extended or adjusted under 35 U.S.C. 154(b) by 460 days.

(21) Appl. No.: 13/900,527

(22) Filed: May 22, 2013

(65) Prior Publication Data

US 2013/0315656 A1    Nov. 28, 2013

Related U.S. Application Data

(60) Provisional application No. 61/651,109, filed on May 24, 2012.

(51) Int. Cl.
| | | |
|---|---|---|
| F16B 7/08 | (2006.01) | |
| F16B 9/00 | (2006.01) | |
| F16L 41/00 | (2006.01) | |
| F16B 7/04 | (2006.01) | |
| F16B 9/02 | (2006.01) | |
| B63B 17/02 | (2006.01) | |
| F16B 11/00 | (2006.01) | |
| A01G 9/14 | (2006.01) | |

(52) U.S. Cl.
CPC ............... *F16B 7/0486* (2013.01); *B63B 17/02* (2013.01); *F16B 9/02* (2013.01); *A01G 9/1407* (2013.01); *F16B 11/006* (2013.01); *Y10T 403/39* (2015.01)

(58) Field of Classification Search
CPC ..... Y10T 403/39; B63B 17/02; F16B 7/0486; F16B 9/02; F16B 11/00; A01G 9/1407

USPC ............ 403/187, 192; 135/88.13, 88.16, 124, 135/136, 119
See application file for complete search history.

(56) References Cited

U.S. PATENT DOCUMENTS

| | | | | | |
|---|---|---|---|---|---|
| 1,143,090 | A | * | 6/1915 | Stiefel | 15/146 |
| 2,609,418 | A | * | 9/1952 | Binns et al. | 174/163 R |
| 2,798,344 | A | * | 7/1957 | Hertel | 451/556 |
| 3,131,899 | A | * | 5/1964 | Luhrs | 248/188 |
| 3,327,723 | A | * | 6/1967 | Burgin | 135/147 |
| 3,543,219 | A | * | 11/1970 | Pautrie | 439/358 |
| 3,657,851 | A | * | 4/1972 | Chambers et al. | 52/378 |
| 4,735,355 | A | * | 4/1988 | Browning | 228/189 |
| 5,456,699 | A | * | 10/1995 | Armstrong | 606/108 |
| 6,361,100 | B1 | * | 3/2002 | Koester | 296/100.18 |
| 6,487,734 | B1 | * | 12/2002 | First | 4/498 |
| 6,565,279 | B1 | * | 5/2003 | Skovronski et al. | 403/192 |
| 7,931,038 | B2 | * | 4/2011 | Jesus | 135/119 |

* cited by examiner

*Primary Examiner* — Gregory Binda
*Assistant Examiner* — Nahid Amiri
(74) *Attorney, Agent, or Firm* — Patent CEO, LLC; Phillip Vales

(57) ABSTRACT

A device and system for holding materials above a created ribbing structure. The device has two unique and novel slip fittings connected together via a plastic pipe that has been cut to a useful length. The slip fittings have a cylindrical attachment port and two wings that serve as the anchor point for a surface. The wings are flat surfaces integrally formed with the cylindrical attachment port and have frictional material attached to the underside thereof. Optional holes are provided on either wing so as to permit a fastener attachment.

3 Claims, 4 Drawing Sheets

SLIP FITTING HOLDING DEVICE AND SYSTEM

CROSS REFERENCE TO RELATED APPLICATION

This application claims benefit of U.S. Provisional Application No. 61/651,109 filed May 24, 2012.

FIELD OF THE INVENTION

The present invention relates to devices that are designed to assist in the construction of home built projects. More particularly, the invention relates to devices that help support fabrics to cover objects such as a boat, tent, playhouse or similar structure.

BACKGROUND OF THE INVENTION

Protecting persons or property from the elements have always been a difficulty. For long term coverage the typical response to this problem is a solid block or wood constructed house or structure to completely cover the intended items or persons with a supported roof. Other forms of temporary coverage of oneself or property typically involve using a large piece of environmentally resistant material or fabric and associated gear or parts.

For temporary housing such as a tent their a numerous parts that must be unpacked organized and rearranged to obtain the final structure. Typically, a manufacturer includes a set of lengthy instructions to help the user understand how to set up the numerous pieces into a convenient whole. Videos are even available of sites such as YOUTUBE to visually show people how to construct their tent.

Other types of coverings protect boats from the environmental damage so common in and around coastal regions as well as in transit when not in use. The prior art has several different types of boat cover designs such as a tent pole design and a fixed rib design. These are both difficult to setup and require instructions for the installation of both. Thus, their needs to be a simple mechanism to cover people and property in an easy, fast manner.

Prior art slip fittings have included a Snap Tee Slip Fittings that have a partially circular attachment point having an opening for insertion of another tubular structure; if one were to imagine the mouth of these fittings it is as if a circular tube were sliced at one side cutting a linear section of the pipe thereby creating a mouth or attachment point. Thus, Snap Slip Fittings have a circular portion that is utilized to snap on to a length of another PVC pipe of the same size as the diameter of the circular attachment point. However, when used these fittings are only able to hold a pipe with the same size, otherwise they disengage from the other pipe. Thus, there is a need to overcome this problem that is a universal solution for corners, edges, rounded surfaces, railings and more.

The present invention overcomes the deficiencies of the known art and the problems that remain unsolved by providing a device and method for an easy to assemble support structure.

SUMMARY OF THE INVENTION

In a first embodiment a holding device comprising:
a first piece of material-having a first front side and a first back side as well as
  a first lateral side; and
  a second lateral side;
a second piece of material attached to the first piece of material where the second piece of material has a second front side and a second back side as well as a third lateral side; and
  a fourth lateral side such that the second lateral side is directly integrally attached to the fourth lateral side without any intervening devices such that the first piece of material and the second piece of material are arranged at an interface angle less than a straight angle—further comprising: a cylindrical device having a first mouth that is integrally located between a first bottom side of the first piece of material and a second bottom side of the second piece of material wherein a portion of the first bottom side of the first piece of material and a portion of the second bottom side of the second piece of material extend inwards within the mouth of the cylindrical device.

In another embodiment, slip fitting holding system comprising:
  a first slip fitting having
    an integral cylindrical port having a first integral mouth at one end and a second integral mouth at an opposite end thereof and
    an inner surface of the cylindrical port having a cavity between the inner surface and the first and second mouths thereof and
  an angled gripping surface integrally formed from a first piece of material and a second piece of material integrally attached together along
    a first edge of the first piece of material and a second edge of the second piece of material—such that the cylindrical port first integral mouth interfaces with a first back portion of the first piece of material and a second back portion of the second piece of material along a portion of the first edge of the first piece of material and a portion of the second edge of the second piece of material.

In another embodiment, a slip fitting comprising:
a first wing and a second wing integrally attached at a first edge of the first wing and at a second edge of the second wing with an angle less than a straight angle on a front side there between such that the first edge and the second edge are directly integrally attached together without any intermediate devices further having
  a cylindrical attachment site integrally formed on a rear portion of the slip fitting opposite a front side having the angle less than the straight angle such that the cylindrical attachment site is integrally formed on a first rear portion of the first wing and a second rear portion of the second wing
such that the cylindrical attachment site has an integral mouth interfacing with a first rear portion of the first wing and a second rear portion of the second wing along a first edge portion of the first wing and a second edge portion of the second wing.

BRIEF DESCRIPTION OF THE DRAWINGS

The preferred embodiments of the invention will hereinafter be described in conjunction with the appended drawings provided to illustrate and not to limit the invention, in which.

Like reference numerals refer to like parts throughout the several views of the drawings.

DETAILED DESCRIPTION

The following detailed description is merely exemplary in nature and is not intended to limit the described embodiments or the application and uses of the described embodiments. As used herein, the word "exemplary" or "illustrative" means "serving as an example, instance, or illustration." All of the implementations described below are exemplary implementations provided to enable persons skilled in the art to make or use the embodiments of the disclosure and are not intended to limit the scope of the disclosure, which is defined by the claims. For purposes of description herein, the terms "upper", "lower", "left", "rear", "right", "front", "vertical", "horizontal", and derivatives thereof shall relate to the invention as oriented in each figure. Furthermore, there is no intention to be bound by any expressed or implied theory presented in the preceding technical field, background, brief summary or the following detailed description. It is also to be understood that the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

The instant invention has a variety of benefits that become apparent when considering its materials, simplicity of design and ease of installation. These are namely:

1) because the majority of the device can be manufactured from inexpensive plastics such as PVC the device does not cost as much as previous solutions;

2) the simple design permits the easy porting to and from an item to be covered, whether boat, plants for a greenhouse, child's playhouse etcetera;

3) the slip fitting mechanism is easy to install requiring almost no tools save for a cutting tool for the cutting of a PVC pipe to an appropriate size that is larger than the distance between two opposed points of tensioning the device; typically, it would be brought up against an edged surface such as a boat edge, railing, wood ninety degree edge used as a floor base frame and similar edges;

4) the device is able to be repacked and reused again and again since it does not have to be permanently installed; rather, it can be taken down, stored in a convenient package and reinstalled in another location and for a completely different use; of course, the PVC pipe in the other location would have to be cut to another distance between the two tensioning points whereby the PVC pipe would be cut to a size larger than the size between the two tensioned points and it might require using a entirely different PVC pipe from the previous installation. The device used to cut the pipe can be any type of cutting tool useable to cut lightweight material such as handsaw, drywall saw, hacksaw and similar types of tools.

Description

Figure 1:
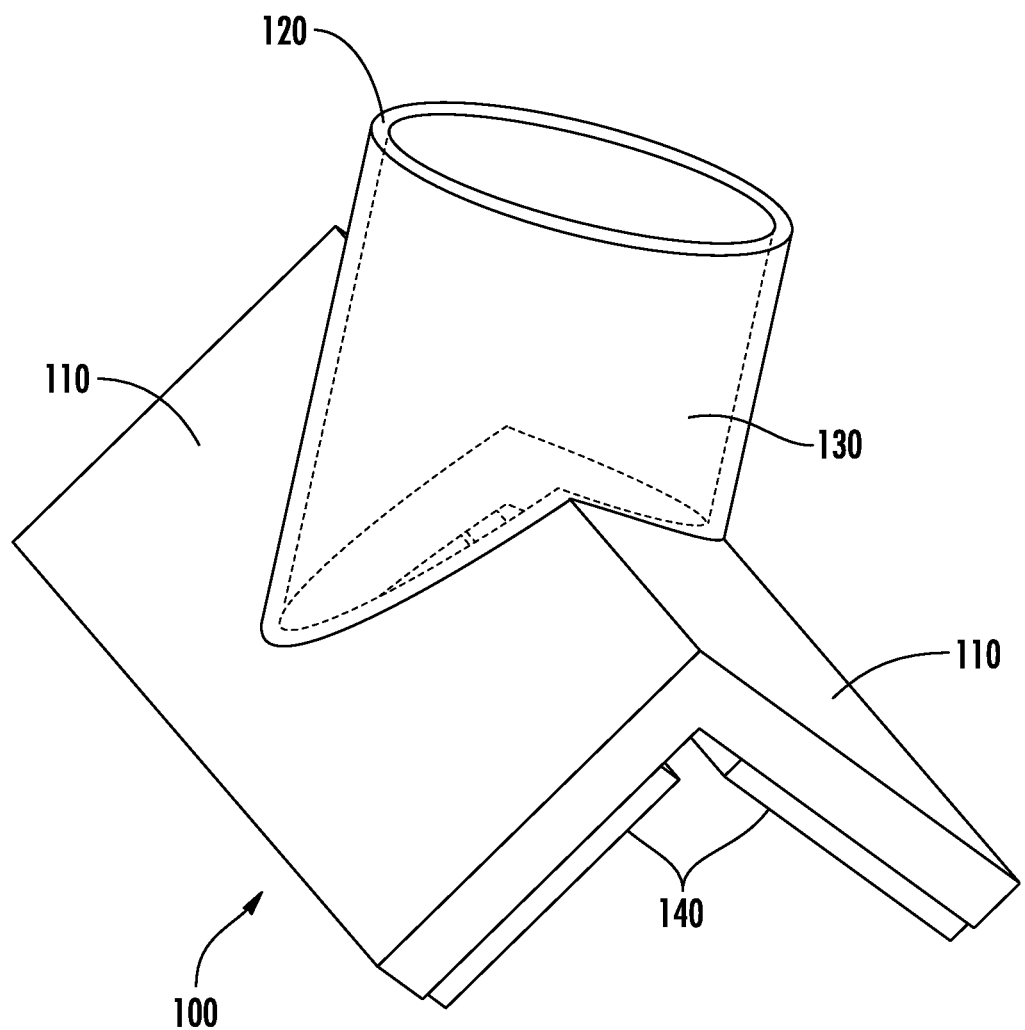
FIG. 1 presents an isometric view of a novel holding mechanism as taught in an embodiment.
Figure 2:
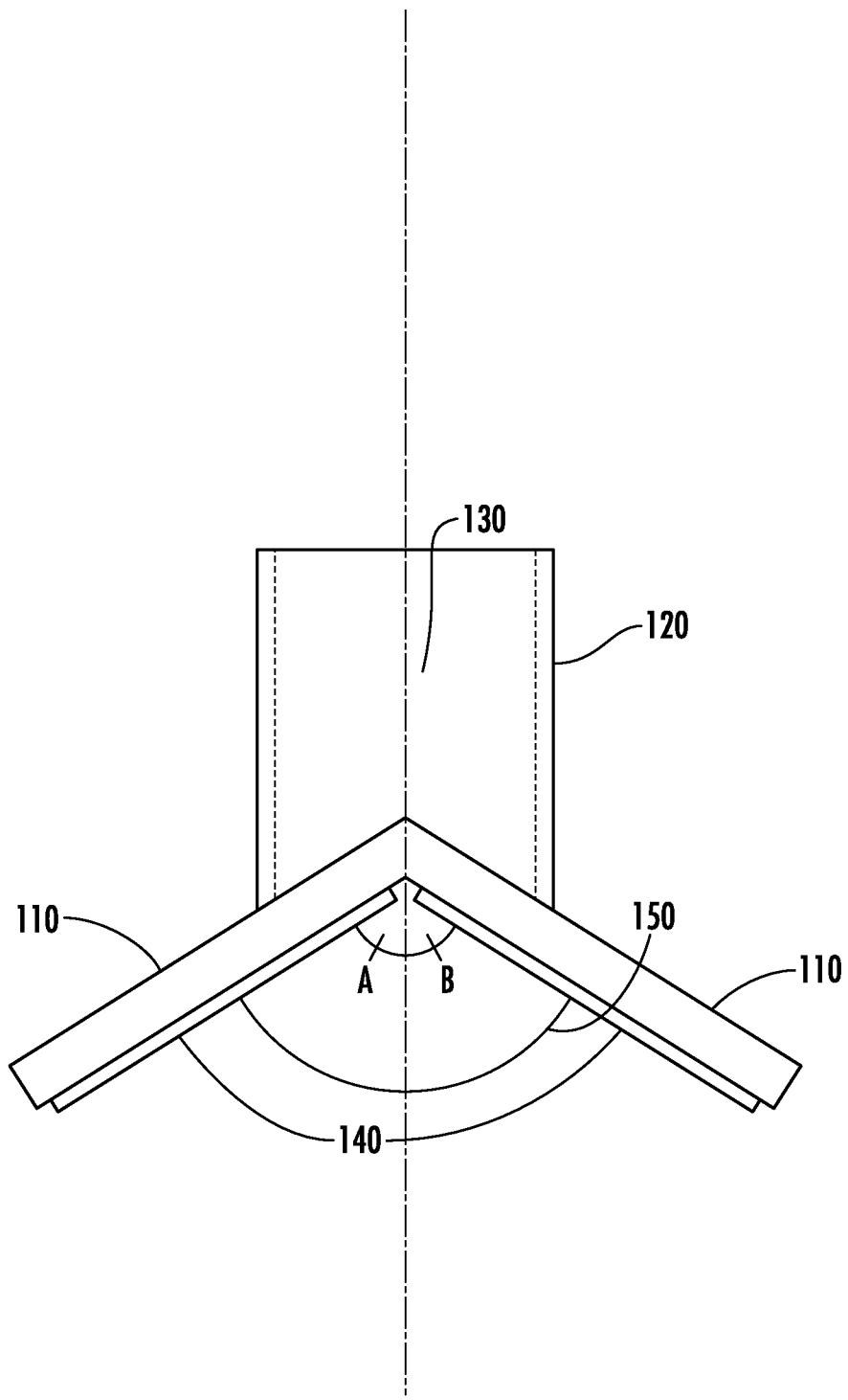
FIG. 2 presents a top view of a novel holding mechanism as taught in an embodiment.

FIGS. 1-2 illustrate a novel integrally molded PVC holding mechanism 100 having three major structures; with the exception of the peel off rubber backings described below the three structures are molded into a single unit from a mold. The molded PVC fitting unit 100 has two angled rectangular wings 110 disposed in the front of the device to provide for holding action when brought into physical contact with an angled surface; they meet at one edge and are integrally formed. These two have a back surface and a front surface; the back surface meets a cylinder 120 whilst the front surface of the wings 110 have two strips of rubber with a peel off single sided adhesive applied to the front surface of each wing. The two wings 110 are arranged having an angle 150 (90 degree preferred, other angles as needed) between the wings 110. On the back of the device is a hollow cylinder 120 shaped to meet the two wings 110 on their back surface. The hollow zone 130 is designed for the reception of PVC pipe therein and the corresponding construction of structures from the use of two novel PVC fittings with a corresponding PVC pipe. The hollow zone 130 continues within the cylinder 120 until it reaches the back of the two angled wings 110. Inside the cylinder 120, the edge of the integral wings 110 makes a stopping point whereby the inserted PVC pipe can not proceed further. FIG. 1 also shows optional perforations on either or both wings 110 for attachment of a fastener such as a screw through the hole and to a surface such as piece of wood, boat rail, or similar surface.

Rubber Slip Prevention

A strip 140 of rubber having an adhesive on one side with a peel off backing is applied at manufacture to the front of each rectangular wing 110 so as to provide a non-slip surface. The peel off backing adhesive rubber strip 140 corresponds generally to the shape of the wings 110 so as to provide an appropriate fit and maximum holding action.

Wings Angle

The two rectangular wings 110 shown in FIGS. 1-2 have an angle item number 150 between them representing a 90 degree right angle. Additionally, the two wings 110 are arranged in such a fashion that the angle A, B from the centerline of either wing is changeable so as to fit the needs of the implementation. For example, for some implementations it would be better to have a 30-60, 45-45, 60-30 or most generally any angle so desired for either one that is less than 90 degrees (A, B<90 degrees). The other angle would necessarily take up the remaining angle to sum to a total of 90 degrees. It should be noted that the preferred embodiment has a 30-60 degree angle for the A,B angle measurements with item angle 150 as a 90 degree right angle.

Logical Extension

The advanced slip fitting holding device and system of this invention is designed to grasp edges, railings and similar surfaces suitable to effect physical resistance to motion from its static position once tensioned between two points. It should be noted that routine experimentation has shown that the device permits the surface so grasped by the pair of two wings to have any angle up to and including 140 degrees.

Method of Application Notes:

In this process, an optional step includes the dropping of the improved slip fitting system from a size of ¾ to ½ fitting through the insertion in the cylinder of the improved slip fitting a regular reduction ¾ to ½ inch fitting that would also be included in a kit with the improved slip fitting with wings. This permits the tensioning of different size pipes and distances between two points as different pipes have different possibility of flexing over the double sided span. This because if the ¾ PVC pipe is too short say less then 6 feet it is difficult to bend whilst it is possible to bend it for greater lengths; similarly, it is easy to bend a ½ PVC pipe down to a length of 2.5 to 3 feet in length; any less then that it becomes difficult to get a proper bow in the pipe.

Figure 3:
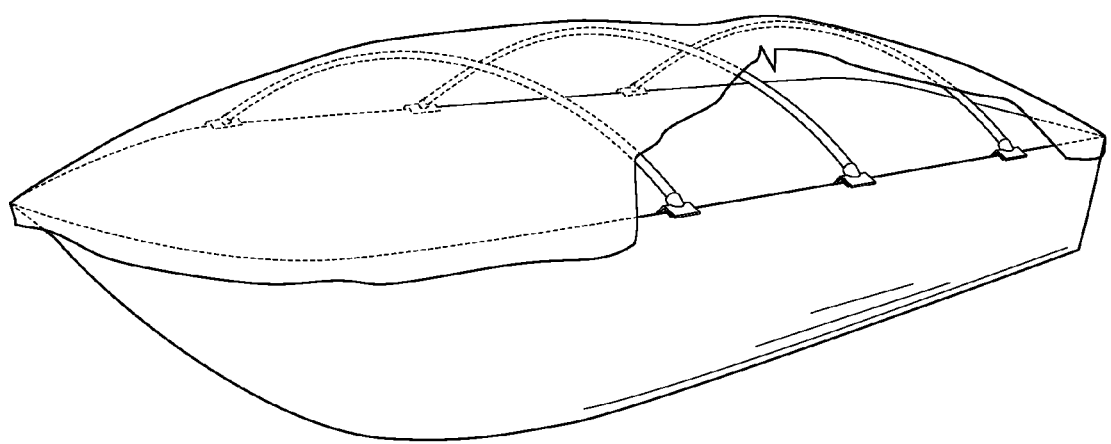
FIG. 3 illustrates a perspective view of a boat having the Improved Holding System as applied to a boat.

FIG. 3 illustrates a perspective view of a boat having the Improved Holding System as applied to a boat. A PVC pipe has been inserted at either end thereof within the two cylinders 120 of two holding mechanisms 100 of FIGS. 1-2. The rubber strips 140 on the front surface of both wings of each holding mechanism grasp the top edges or rim of the boat in FIG. 3. The device is multiplied down the length of the boat so as to permit the spreading of a boat cover atop the support structure thereon as shown.

Figure 4:
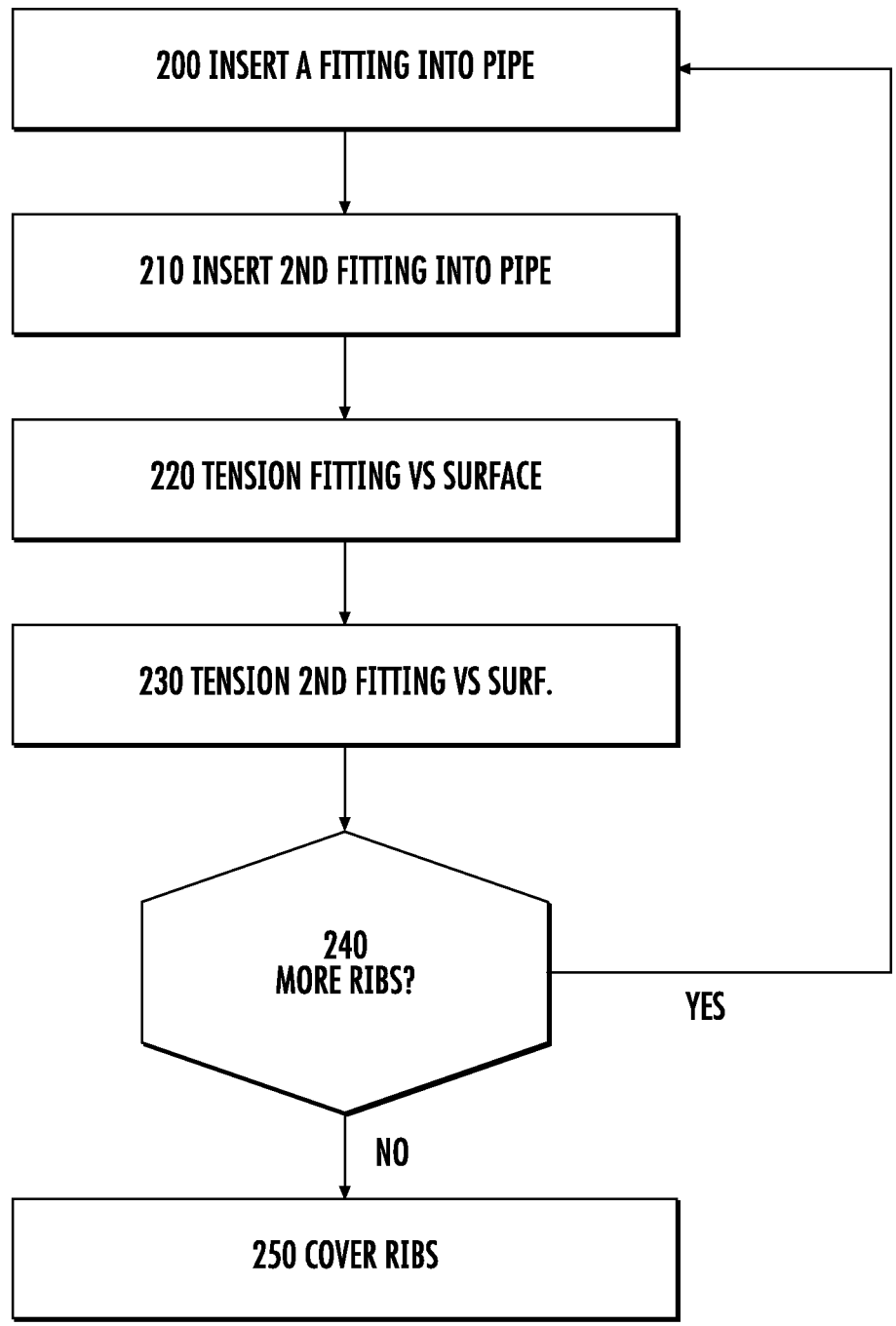
FIG. 4 illustrates the process of using the novel Improved Holding Systems and mechanisms taught herein.

FIG. 4 illustrates the process of using the novel mechanisms taught herein. First a user inserts 200 a novel PVC molded fitting 100 on one side of a PVC pipe using the hollow zone 130 of cylinder 120. Once the first fitting is secure in the pipe, the other side of the PVC pipe is inserted 210 into another novel PVC molded fitting 100. Thus, a covering rib has been created that can be utilized with other covering ribs to support a fabric, canvas, plastic or similar covering material. Next, the simply created device is tensioned 220 against a first right angled or similar surface edge using one of the devices 100 inserted into a PVC tube; then another device 100 attached to the same PVC tube is tensioned 230 against a second right angled or similar surface edge forming a rib against a convenient surface. The process the repeats 240 until all the necessary ribs are so tensioned for reception of a covering material. A covering material is applied 250 to the array of ribs that have been created against a suitable edged surface of an item to be covered. It should be appreciated that whilst the specific set of steps has been described they can be rearranged without departing from the spirit of the invention. For example, the instant application covers changes in the process by which the first PVC fitting 100 is inserted in the PVC pipe then tensioned, then the second PVC fitting 100 is inserted in the PVC pipe then tensioned against a surface. Similar changes to the process include setting the fitting in place against an edge, inserting the PVC pipe therein and proceeding to do the same for the other fitting 100 with the other end of the PVC pipe. Thus, applicant's invention covers any rearrangement of the steps of placing the fitting(s) 100, inserting the pipe in the back of the fitting(s) etcetera.

Uses:

The invention can be utilized in a variety of environments from coverings for children's playhouses, boat covers, lawn mower protection, temporary greenhouses and much more. In the event that a useable tensioned edge or railing is not available in a particular environment, applicant envisions hobbyists creating a base system whereby an edge can be Thus, a simple easy to install and inexpensive mechanism for setting up a novel protection system has been described.

Other Considerations

The moulded PVC fitting is designed to be slipped on both ends of a length of light weight ¾ inch PVC pipe. The pipe length is purposely cut to a size slightly larger than the distance between two rails (as if between a boat bow rails or any other opposed set of right angle surfaces).

Since all PVC pipe will flex under tension, the fittings allow you to instantly install and position a tensioned bow capable of supporting all types of cover material without the need for tools.

The fitting will be molded ⅛ inch thick (mol) as is standard for other PVC fittings. The right angle will be 1.25 inches deep and finished inside with a 1 in wide strip of ⅛th inch thick high density foam rubber. The foam rubber will provide a non slip grip on any metal rail or any other right angle surface.

The center slip opening will accept any ¾ PVC fitting including inside slip fittings that allow downsizing to ½ in PVC pipe.

Moulded with 2 outboard centered ⅛th diameter holes that will allow user to easily lock the fitting in position if so desired.

Center slip offset 15 degrees; this allows the pipe to angle up from the ¾ inch slip opening at either 60 degrees or when flipped over 30 degrees.

An elbow or angled PVC fitting such as a 15, 30, 45, 60 or any angle necessary can be utilized to insert an end of the rib PVC pipe therein; then the other side of the elbow or angled PVC fitting is inserted into the back cylinder of the winged slip fitting. This has the intended effect of shifting the angle of the attachment point such that the rib so equipped can easily adapt to other surfaces whether straight edged, rounded, railing, or almost any surface configuration. A second elbow or angled PVC fitting is optionally used at the other end of the rib PVC pipe and other winged fitting. It should be understood that the diameter of the aforementioned winged fitting, PVC pipe and elbow or angled fitting is of the kind that permits a snug fit whether this or that component is inserted within or on top of the other component. Thus, it is envisioned that any of the above components maybe inserted within another one or on top of the external surface of the other component as long as the appropriate diameter sizes are provided at manufacture.

Bow Creation

After cutting a piece of PVC pipe to a length slightly longer than the distance between two rails or any opposed set of angled surface, you simply flex the PVC pipe to fit. Thus, you will create an arch under tension. When you position the bowed arch between the two opposed surfaces, as illustrated in FIG. 3, the static tension will hold the arch in position. The rubber strips on the inside of the right angle surfaces will prevent slippage.

The above-described embodiments are merely exemplary illustrations of implementations set forth for a clear understanding of the principles of the invention. Many variations, combinations, modifications or equivalents may be substituted for elements thereof without departing from the scope of the invention. Therefore, it is intended that the invention not be limited to the particular embodiments disclosed as for carrying out this invention, but that the invention will include all the embodiments falling within the scope of the appended claims.

What is claimed is:

1. A holding device comprising:
    a first piece of material-having a first front side and a first back side as well as a first lateral side; and
    a second lateral side;
    a second piece of material attached to the first piece of material where the second piece of material has a second front side and a second back side as well as a third lateral side; and
    a fourth lateral side such that the second lateral side is directly integrally attached to the fourth lateral side without any intervening devices such that the first piece of material and the second piece of material are arranged at an interface angle less than a straight angle;
    further comprising: a cylindrical device having a first mouth that is integrally located between a first bottom side of the first piece of material and a second bottom side of the second piece of material wherein a portion of the first bottom side of the first piece of material and a portion of the second bottom side of the second piece of material extend inwards within the mouth of the cylindrical device.

2. An slip fitting holding system comprising:
    a first slip fitting having
        an integral cylindrical port having a first integral mouth at one end and a second integral mouth at an opposite end thereof and an inner surface of the cylindrical port having a cavity between the inner surface and the first and second mouths thereof and an angled gripping surface integrally formed from a first piece of material and a second piece of material integrally attached together along
a first edge of the first piece of material and a second edge of the second piece of material such that the cylindrical port first integral mouth interfaces with a first back portion of the first piece of material and a second back portion of the second piece of material along a portion of the first edge of the first piece of material and a portion of the second edge of the second piece of material.

3. A slip fitting comprising:

a first wing and a second wing integrally attached at a first edge of the first wing and at a second edge of the second wing with an angle less than a straight angle on a front side there between such that the first edge and the second edge are directly integrally attached together without any intermediate devices further having a cylindrical attachment site integrally formed on a rear portion of the slip fitting opposite a front side having the angle less than the straight angle such that the cylindrical attachment site is integrally formed on a first rear portion of the first wing and a second rear portion of the second wing such that the cylindrical attachment site has an integral mouth interfacing with a first rear portion of the first wing and a second rear portion of the second wing along a first edge portion of the first wing and a second edge portion of the second wing.

\* \* \* \* \*